United States Patent
Kato

(10) Patent No.: US 9,076,481 B1
(45) Date of Patent: Jul. 7, 2015

(54) DISK DRIVE DEVICE WITH DISK DETECTION MECHANISM

(71) Applicant: Alpine Electronics, Inc., Tokyo (JP)

(72) Inventor: Ichiro Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 14/547,943

(22) Filed: Nov. 19, 2014

(30) Foreign Application Priority Data

Dec. 16, 2013 (JP) ................................ 2013-259274

(51) Int. Cl.
*G11B 17/05* (2006.01)
*G11B 17/051* (2006.01)

(52) U.S. Cl.
CPC .................................... *G11B 17/051* (2013.01)

(58) Field of Classification Search
USPC ......................................................... 720/622
See application file for complete search history.

(56) References Cited

U.S. PATENT DOCUMENTS

| 5,719,844 | A * | 2/1998 | Abe | 720/625 |
| 7,069,567 | B2 * | 6/2006 | Tsuchiya | 720/623 |
| 7,454,768 | B2 * | 11/2008 | Yasaki et al. | 720/624 |
| 7,870,571 | B2 * | 1/2011 | Yamanaka | 720/624 |
| 2004/0148618 | A1 * | 7/2004 | Tsuchiya | 720/621 |
| 2007/0199007 | A1 * | 8/2007 | Yasaki et al. | 720/624 |

* cited by examiner

*Primary Examiner* — Wayne Young
*Assistant Examiner* — Carlos E Garcia
(74) *Attorney, Agent, or Firm* — Brinks Gilson & Lione

(57) ABSTRACT

In a disk drive device, a guide section is formed to protrude from the front surface of a guide top and face a front panel of a frame member with a detection pin therebetween. The guide section forms an inclined side that faces a free end of the detection pin with a gap therebetween. If a disk is shifted from the middle of a disk insertion slot in the right-left direction and is inserted into the disk insertion slot, the detection pin is flexibly deformed by a disk insertion force and is brought into pressure contact with the inclined side. A component force is exerted on the detection pin in a direction in which the detection pin is moved away from the middle of the disk insertion slot in the width direction. The component force smoothly rotates a detection lever from an initial position to an operating position.

2 Claims, 12 Drawing Sheets

(Prior Art)

DISK DRIVE DEVICE WITH DISK DETECTION MECHANISM

RELATED APPLICATIONS

The present application claims priority to Japanese Patent Application Serial Number 2013-259274, filed Dec. 16, 2013, the entirety of which is hereby incorporated by reference.

BACKGROUND OF THE INVENTION

1. Field of the Invention

The present invention relates to a disk drive device that transports a disk inserted through a disk insertion slot to the inside of the body of the device to perform, for example, a reproducing operation and, in particular, to a disk detection mechanism that detects insertion and ejection of a disk.

2. Description of the Related Art

In-car disk drive devices that mount a compact disc (CD) or a digital versatile disc (DVD) therein may include a device body having a horizontally long disk insertion slot formed in the front surface, a transport mechanism for automatically transporting a disk between the disk insertion slot and a play position, a drive mechanism that chucks the disk at the play position and rotatingly drives the disk, and a disk detection mechanism that detects insertion and/or ejection of the disk (refer to, for example, Japanese Unexamined Patent Application Publication No. 2003-228903).

The transport mechanism may include a roller bracket and a guide top (a pinching member). The roller bracket supports a transport roller and the guide top pinches a disk between itself and the transport roller. The roller bracket is biased by an elastic force of a spring in a direction in which the transport roller moves closer to the lower surface of the guide top.

The drive mechanism may include a turntable rotated by a motor serving as a drive source, a clamper that chucks a disk between itself and the turntable, and an optical pickup that records and/or reproduces information on the disk. The optical pickup may be movable in the radial direction of the disk.

As illustrated in FIG. 15, the disk detection mechanism may include a support plate 100 fixed to the upper or lower surface of the device body, a pair of detection levers 102 each supported by the support plate 100 in a rotatable manner about a spindle 101, a pair of detection pins 103 each upstanding on the top end of one of the detection levers 102, and a pair of springs 104 each urging one of the detection levers 102 in a direction in which the detection pins 103 move closer to each other. The detection mechanism may also include a detection switch (not illustrated) that is turned on and off by rotation of the detection levers 102. The detection pins 103 are disposed on an inner side of the disk insertion slot.

A disk drive device having such a configuration has an eject state in which a disk is not mounted in the device body. As illustrated in FIG. 15, in the eject state, each of two detection levers 102 is pulled by a tension force from the spring 104 and stays at an initial position. The distance between the two detection pins 103 is maintained at a minimum distance L. At that time, if a disk D is inserted into the inside of the device body through the disk insertion slot, the outer periphery of the disk D is brought into contact with the detection pins 103. Accordingly, each of the detection pins 103 is moved outward (in a direction indicated by a dashed line) and, thus, each of the detection levers 102 rotates about the spindle 101 from the initial position toward an operating position. As a result, the detection switch is turned on by the rotation of the detection lever 102, and an operation signal is output. The transport roller rotates in a predetermined direction in response to the operation signal. Consequently, the disk D is pinched between the transport roller and the guide top and is transported to the play position. At the play position, a reproducing operation is performed on the disk D by the optical pickup. Note that the distance between the detection pins 103 gradually increases as the disk D is transported. The distance is maximized when the diameter of the disk D coincides with a line extending between the two detection pins 103. Thereafter, the distance gradually decreases and reaches the minimum distance L again.

In addition, if an eject button is activated when the disk D is located at the play position, the chucked disk D is released and the transport roller is rotatingly driven in a direction opposite to the above-described direction. Accordingly, the disk D is pinched between the transport roller and the guide top and is transported toward the disk insertion slot. If the disk D reaches such a position that almost an entire portion of the disk D protrudes from the disk insertion slot, an operation signal is output from the above-described detection switch. Thus, rotation of the transport roller is stopped in response to the operation signal. By gripping the disk D, a user can remove the disk D from the device body.

SUMMARY OF THE INVENTION

In existing disk drive devices configured in the above-described manner, if a disk is shifted from a middle of the disk insertion slot in a right-left direction and is inserted into the disk insertion slot, or if a disk is roughly inserted into the disk insertion slot, the detection lever that supports the detection pin may be damaged due to a pressing force exerted from the disk onto the detection pin.

To address such an issue, a technique has been developed for reducing a friction force generated between a disk and a detection pin. In the technique a detection pin is provided with a cylindrical resin roller rotatably supported by the detection pin. However, the additional resin roller increases a number of parts and results in an increase in parts costs. In addition, the additional resin roller causes issues in ease of assembly.

Furthermore, a technique for increasing a rigidity of the detection pin by forming a circular arc guide groove in an additional member that faces a support plate via a detection lever and is slidably engaging a top end of the detection pin with the guide groove has been developed. However, the technique requires the detection lever to be biased by a spring having a high spring load to stay at the initial position, since a large friction force may be generated between the detection pin and the guide groove due to assembly errors in parts. This technique may increase the difficulty for inserting a disk.

Accordingly, it is an object of the present invention to provide a disk drive device having a simplified configuration that is capable of preventing damage to a disk detection mechanism.

According to an aspect of the present invention, a disk drive devices including a device body, a lever member, a detection pin, and a pressing memobery are disclosed. The device body has a disk insertion slot formed in a front surface thereof. The lever member is disposed inside of the device body so as to be movable between an initial position and an operating position. The detection pin is disposed on an inner side of the disk insertion slot, where the detection pin is supported by the lever member in a cantilever fashion. The pressing member is configured to bias the lever member toward the initial position.

Disk insertion into and/or disk ejection from the device body are detected by movement of the lever member between the initial position and the operating position when the detection pin is brought into contact with an outer periphery of a disk and is urged in a direction in which the detection pin moves away from a middle of the disk insertion slot in a width direction.

A guide section is provided inside of the device body so as to face a front surface of the device body with the detection pin therebetween, and the guide section is formed as an inclined side that faces a free end of the detection pin with a gap therebetween. When the lever member is located at the initial position and when the detection pin is subjected to a pressing force of a predetermined value or higher from an inserted disk and is brought into pressure contact with the inclined side formed by the guide section, a component force is exerted on the detection pin in a direction in which the detection pin is moved away from the middle of the disk insertion slot in the width direction.

For implementations of a disk drive device having such a configuration, when the disk is shifted from the middle of the disk insertion slot in a right-left direction and is inserted into the disk insertion slot, or when the disk is roughly inserted into the disk insertion slot and when the detection pin is flexibly deformed in a gap due to a disk insertion force received and is brought into pressure contact with the inclined side formed by the guide section, the component force is exerted on the detection pin in a direction in which the detection pin is moved away from the middle of the disk insertion slot in the width direction.

Accordingly, the lever member can be smoothly moved from the initial position to the operating position due to the component force and, thus, deformation or damage of the lever member can be prevented. It will be appreciated that when a disk is inserted at substantially the middle of the disk insertion slot, the detection pin is brought into contact with the outer periphery of the disk and is urged in a direction in which the detection pin is moved away from the middle of the disk insertion slot in the width direction. Thus, when a disk is inserted in a normal manner, the detection pin is not in pressure contact with the guide section. Accordingly, in such a case, the lever member can be also smoothly moved from the initial position to the operating position.

In the above-described configuration, the material of the guide section is not limited to any particular material. When a transport roller that transports a disk from/to an outside of the device body and a pinching member that pinches the disk between itself and the transport roller are disposed on the inner side of the disk insertion slot, when the guide section is formed on the pinching member in an integrated manner, an existing pinching member can be used as the guide section without providing an additional member.

DESCRIPTION OF THE PREFERRED EMBODIMENTS

Figure 1:
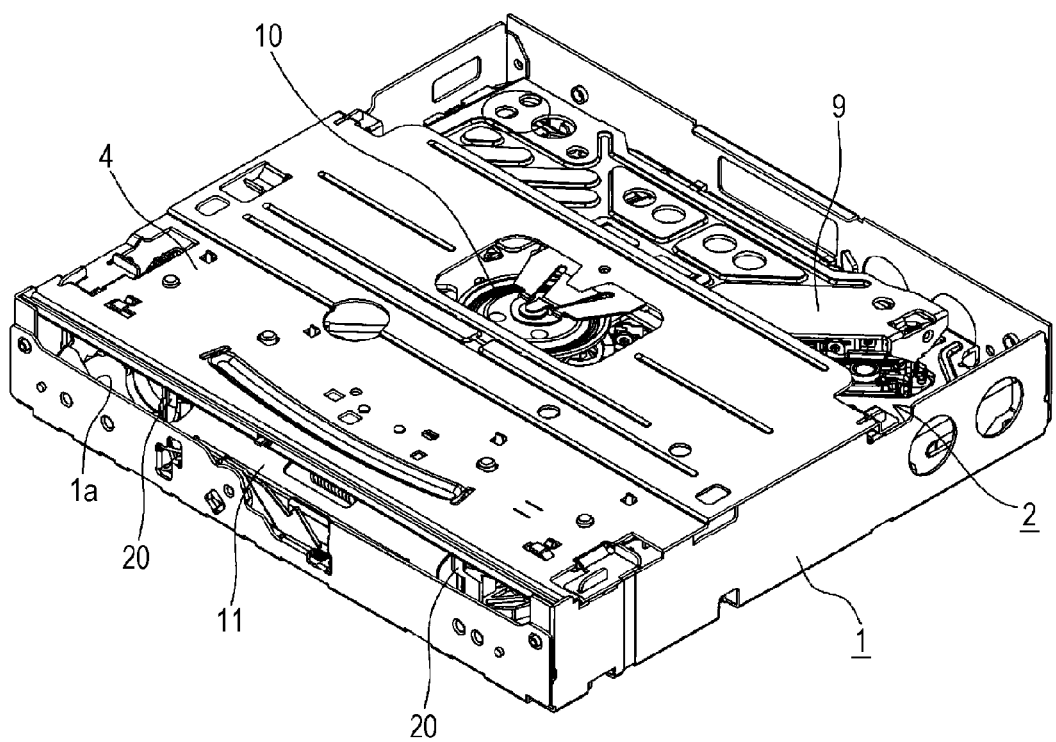
FIG. 1 is a perspective view of one implemenetations of a disk drive device.
Figure 2:
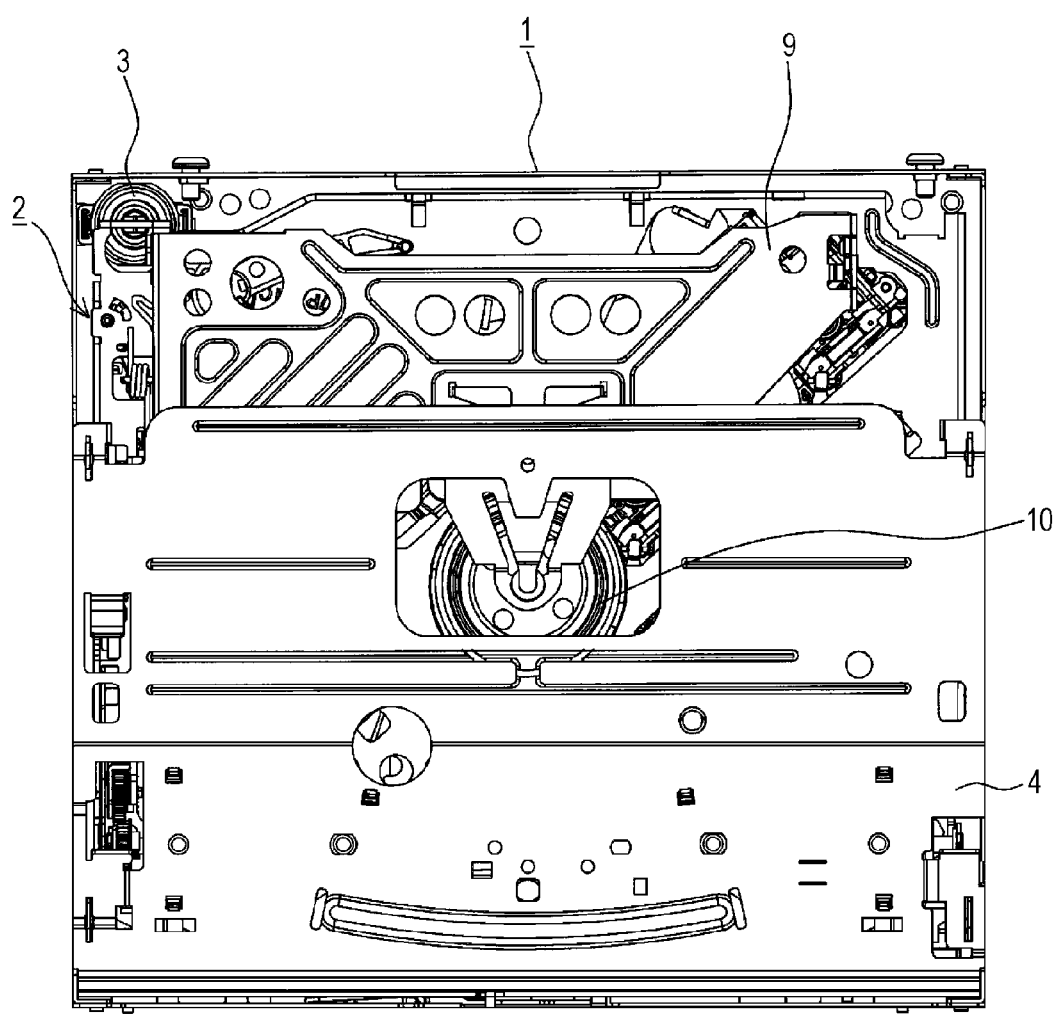
FIG. 2 is a plan view of the disk drive device.
Figure 3:
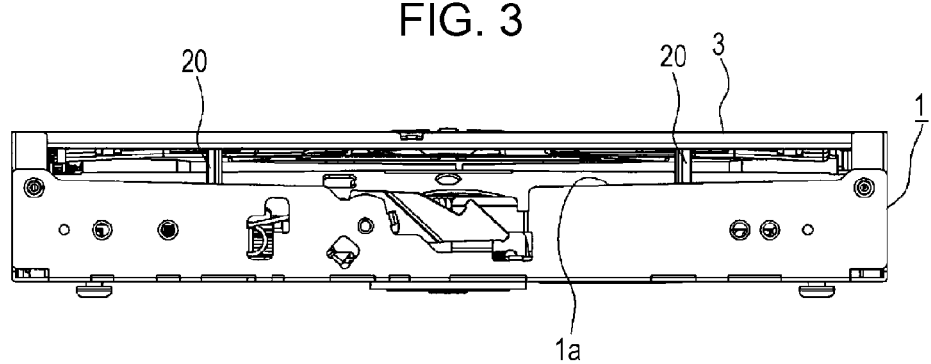
FIG. 3 is a front view of the disk drive device.

Exemplary implementations of the present invention are described below with reference to the accompanying drawings. As illustrated in FIGS. 1 to 6, implementations of a disk drive device include a box-shaped frame member 1 that serves as an outer shell of a device body and a drive unit 2 disposed in the frame member 1. The drive unit 2 is supported by the frame member 1 via elastic members, such as a damper 3 and a coil spring (not illustrated).

A front panel of the frame member 1 has a horizontally long disk insertion slot 1a formed therein. A disk D is inserted into the inside of the frame member 1 through the disk insertion slot 1a and is ejected from the frame member 1 through the disk insertion slot 1a. In addition, a top chassis 4 is installed on the top of the frame member 1 so as to be close to the disk insertion slot 1a. The underside surface of the top chassis 4 has a pair of guide tops 5 (described in more detail below) attached thereto.

The drive unit 2 has a turntable 6, a spindle motor 7, and an optical pickup 8 mounted therein. The turntable 6 rotates the disk D. The spindle motor 7 serves as a drive source of the turntable 6. The optical pickup 8 reads information signals from the disk D. It will be appreciated that the drive unit 2 can be selectively switched between a lock mode and an unlock mode by a lock switching mechanism (not illustrated). When the disk D is ejected (unloaded), the drive unit 2 enters the lock mode in which the drive unit 2 is fixedly supported by the frame member 1. Alternatively, when the disk D is in a play mode, the drive unit 2 enters the unlock mode in which the drive unit 2 is elastically supported by the frame member 1.

A clamp arm 9 is supported by a rear end portion of the drive unit 2 in a rotatable manner. The top end portion of the clamp arm 9 has a clamper 10 rotatably supported thereby. The clamp arm 9 is biased by a coil spring (not illustrated) in a direction in which the clamper 10 moves near to the turntable 6 at all times. When the disk D is ejected, the clamper 10 is controlled so as to be separated from the turntable 6 and to be positioned above the turntable 6.

Figure 5:
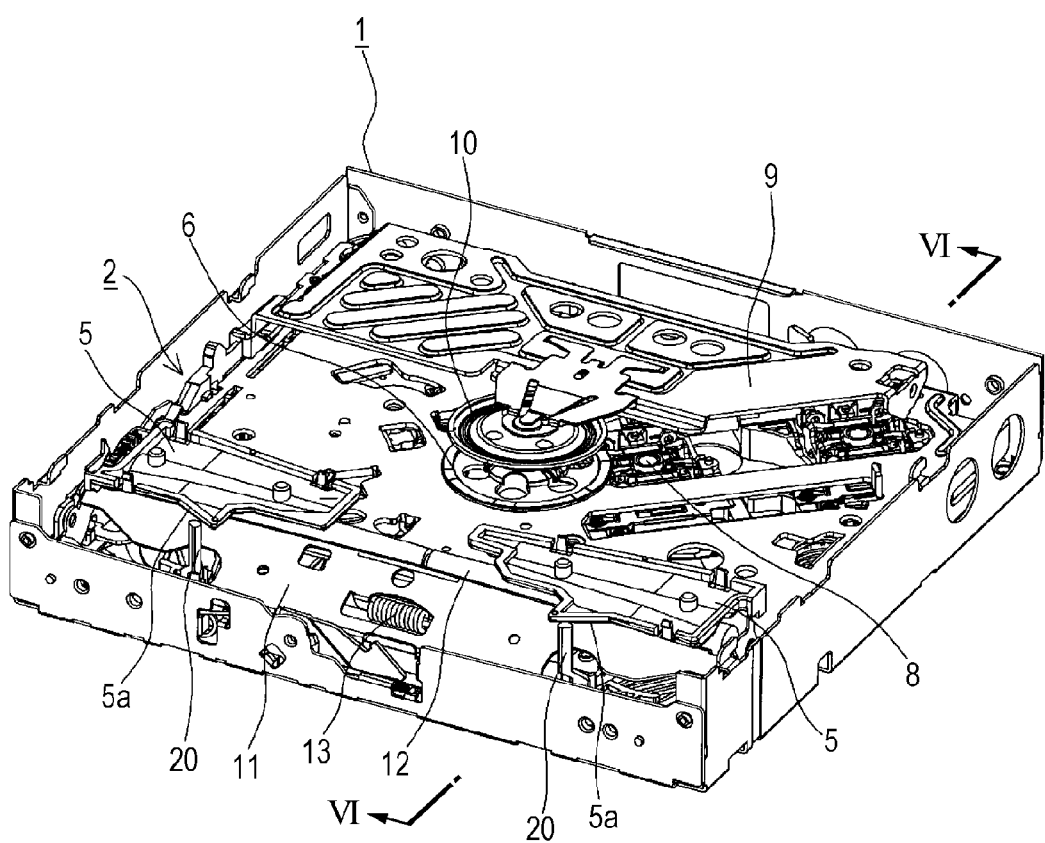
FIG. 5 is a perspective view of the disk drive device with a top chassis removed.
Figure 6:
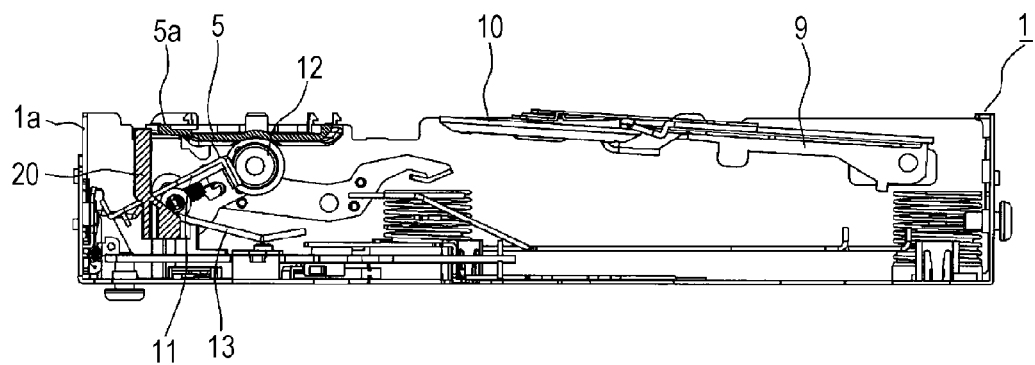
FIG. 6 is a cross-sectional view of the disk drive device taken along a line VI-VI of FIG. 5.
Figure 7:
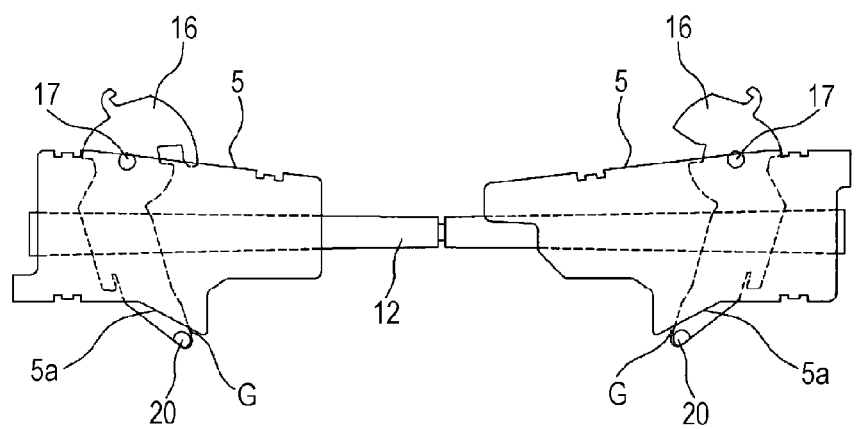
FIG. 7 illustrates main portions of a disk detection mechanism provided in the disk drive device.

Each of the two guide tops 5 is formed from a highly smooth resin molded component. The guide tops 5 are attached to the underside surface of the top chassis 4 at right and left positions using a fixing technique, such as screw fixings. As illustrated in FIGS. 5 and 7, a protruding portion that is triangular in plan view is formed on the front side of the guide top 5 located on the right. A guide section 5a of a front surface of the protruding portion extends from the vertex located adjacent to the front surface of the frame member 1 diagonally backward right. That is, the guide section 5a is formed as an inclined side. Similarly, a protruding portion that is triangular in plan view is formed on the front side of the guide top 5 located on the left. A guide section 5a of a front surface of the protruding portion extends from the vertex located adjacent to the front surface of the frame member 1 diagonally backward left. That is, the guide section 5a is formed as an inclined side.

A roller bracket 11 is swingably supported by the front end portion of the drive unit 2. Both ends of the transport roller 12 are rotatably supported by the roller bracket 11. The roller bracket 11 is biased by an elastic force of a spring 13 in a direction in which the transport roller 12 moves close to the lower surfaces of the guide tops 5. The disk D is pinched between the transport roller 12 and each of the guide tops 5 and is transported. The transport roller 12 can be rotated by a motor (not illustrated) serving as a drive source in clockwise and counterclockwise directions. The motor is started and stopped by ON and OFF signals output from detection switches 14 and 15 (described in more detail below).

Figure 4:
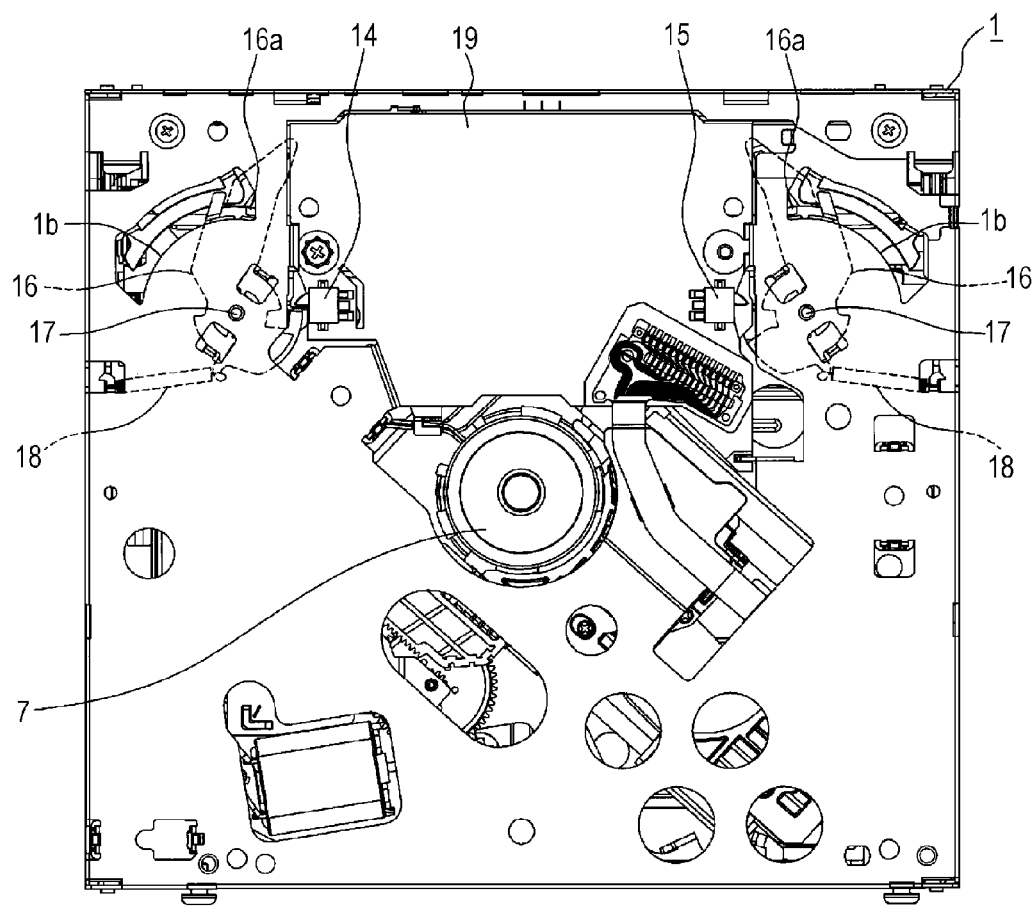
FIG. 4 is a bottom view of the disk drive device.

A pair of detection levers 16 is disposed below the roller bracket 11. As illustrated in FIG. 4, each of the detection levers 16 is supported by the bottom surface of the frame member 1 so as to be rotatable about a spindle 17. The bottom surface of the frame member 1 has a pair of guide holes 1b formed therein. A protrusions 16a formed in the underside surface of each of the detection levers 16 is engaged with a corresponding one of the guide holes 1b and, thus, the rotation angle of the detection lever 16 is regulated so that the detection lever 16 is located between the initial position and the operating position. In addition, a tension spring 18 is disposed between the detection lever 16 and the frame member 1. The tension spring 18 biases the detection lever 16 in a direction in which the top ends of the two detection levers 16 move close to each other, that is, toward the initial position at which the protrusion 16a is brought into contact with an end portion of the guide hole 1b. Furthermore, the bottom surface of the frame member 1 has a circuit board 19 fixed thereto. The above-described detection switches 14 and 15 are mounted on the circuit board 19. The detection switch 14 is turned on and off by rotation of one of the detection levers 16, and the detection switches 15 is turned on and off by rotation of the other detection lever 16.

A detection pin 20 is provided so as to be upstanding on the top end of the upper surface of each of the detection levers 16. The detection pin 20 protrudes in front of the roller bracket 11 at a position at which the detection pin 20 faces the inner side of the disk insertion slot 1a (refer to FIGS. 1 and 3). The detection lever 16 and the detection pin 20 are integrated into one as a resin molded component. Alternatively, the detection pin 20 formed as a separate member may be joined to the detection lever 16 in a cantilever fashion using a fixing technique, such as swaging. A top end portion (a free end) of the detection pin 20 is located in front of the guide section 5a that protrudes from the guide top 5. As illustrated in FIG. 7, in an eject state in which the disk D is not mounted in the device body, the guide section 5a that forms an inclined side faces the detection pin 20 with a gap G therebetween.

An operation performed by a disk drive device having such a configuration is described below.

In an eject state (a standby mode) in which the disk D is not mounted in the device body, the drive unit 2 is in the lock mode so that the drive unit 2 is fixedly supported by the frame member 1. The clamp arm 9 is rotated upward so that the clamper 10 is separated from the turntable 6. In addition, the rear end of the roller bracket 11 that rotatably supports the transport roller 12 is raised. That is, the roller bracket 11 has a forward-bent posture. The outer peripheral surface of the transport roller 12 is subjected to a spring force from the spring 13 and is in pressure contact with the bottom surfaces of the guide tops 5 (refer to FIG. 6). Furthermore, each of the detection levers 16 is subjected to the spring force of the tension spring 18 and stays at the initial position. Thus, the distance between the two detection pins 20 is maintained at a minimum distance.

Figure 8:
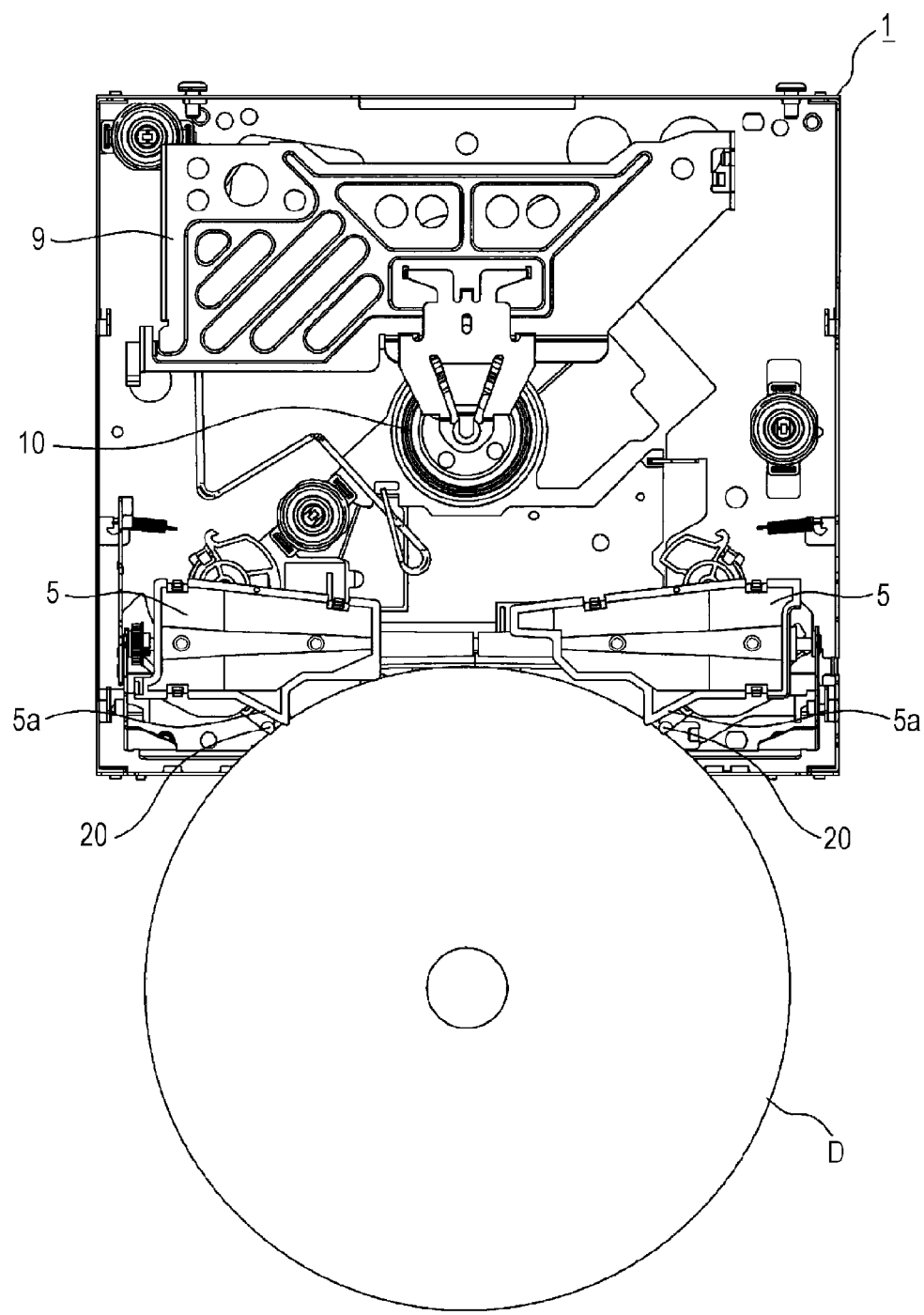
FIG. 8 is a plan view of the disk drive device having a disc inserted therein in a normal manner.

At that time, when a disk D is inserted into the inside of the frame member 1 through the disk insertion slot 1a at substantially the middle of the disk insertion slot 1a in the width direction, the outer periphery of the disk D is brought into contact with the detection pins 20, as illustrated in FIG. 8. Accordingly, each of the detection pins 20 is moved outward and, thus, each of the detection levers 16 rotates about the spindle 17 from the initial position toward the operating position. At that time, since each of the detection pins 20 is moved outward due to the insertion force of the disk D, each of the detection levers 16 that supports the detection pin 20 smoothly rotates about the spindle 17. Thus, each of the detection pins 20 is not brought into contact with the inclined side formed by the guide section 5a.

When the detection levers 16 rotate due to an operation to insert the disk D in this manner, the detection switch 14 is turned on by one of the detection levers 16 first. Thereafter, a motor (not illustrated) starts operating in response to an operation signal generated by the detection switch 14 so as to rotate the transport roller 12 in a predetermined direction. Consequently, the disk D is pinched between the transport roller 12 and the guide tops 5 and is transported to the inside of the frame member 1.

During the operation, the clamp arm 9 and the clamper 10 stay at a standby position above the drive unit 2, and the drive unit 2 is maintained in the lock mode. Accordingly, the disk D is transported to the play position without being in contact with the drive unit 2. When a disk D that is qualified is inserted and transported a predetermined distance, an operation signal is output from the other detection switch 15 due to rotation of the other detection lever 16. Accordingly, it can be determined that the inserted disk D is a qualified one.

However, when a non-circular disk or an object other than a disk is inserted, an operation signal is not output from the detection switch 15 at a predetermined point in time. In such a case, by controlling the motor to rotate the transport roller 12 in a direction opposite the above-described direction, the inserted object can be ejected without transporting the object to the inside of the frame member 1.

When the center of the disk D is transported to a position immediately above the center of the turntable 6, the drive unit 2 is changed from the lock mode to the unlock mode. In addition, the clamp arm 9 is rotated from the standby position downward. Accordingly, the disk D is chucked between the turntable 6 and the clamper 10, and the drive unit 2 enters a play mode. In addition, a switching mechanism (not illustrated) rotates the roller bracket 11 downward in conjunction with the above-described operation. Thus, the transport roller 12 is lowered to a standby position at which the transport roller 12 is not in contact with the bottom surface of the disk D. In addition, the optical pickup 8 is moved outwardly in the radial direction of the disk D, and a switch (not illustrated) is turned on to output an operation signal. In response to the operation signal, the motor serving as the drive source of the transport roller 12 stops.

It will be appreciated that when the spindle motor 7 rotatingly operates in the play mode, the turntable 6, the disk D, and the clamper 10 rotate together. Thus, an information recording operation and/or information reproducing operation are performed by the optical pickup 8 that is moved in the radial direction of the disk D.

An eject button (not illustrated) is provided for the ejection of the disk D from the device body. To eject a disk D from the device body, an operation that is a reverse of the above-described operation is performed. Since chucking of the disk D is released and, in addition, the transport roller 12 is rotated in the opposite direction (the other direction), the disk D is transported toward the disk insertion slot 1a while being pinched between the transport roller 12 and each of the guide tops 5. Like the above-described operation, in such a case, each of the detection pin 20 is brought into contact with the outer periphery of the disk D, and each of the detection pins 20 is moved outward. Thus, the detection switch 14 is turned on by one of the detection levers 16 first. Thereafter, the detection switches 15 are turned on by the other detection lever 16. When the detection switch 15 is turned on, the motor is stopped and, thus, rotation of the transport roller 12 is stopped. At that time, the disk D has been transported so that the almost entire portion of the disk D protrudes from the disk insertion slot 1a. By gripping the disk D, a user can remove the disk D from the device body.

The above description applies to the normal operation in which a qualified disk D is inserted into the disk insertion slot 1a from substantially the middle of the disk insertion slot 1a. If the disk D is shifted from the middle of the disk insertion slot 1a in the right-left direction and is inserted into the disk insertion slot 1a, if the disk D is roughly inserted into the disk insertion slot 1a, or if a non-circular disk is inserted into the disk insertion slot 1a, the detection pin 20 may be bent in the insertion direction and, thus, it may be difficult to move the detection levers 16 outward.

Figure 9:
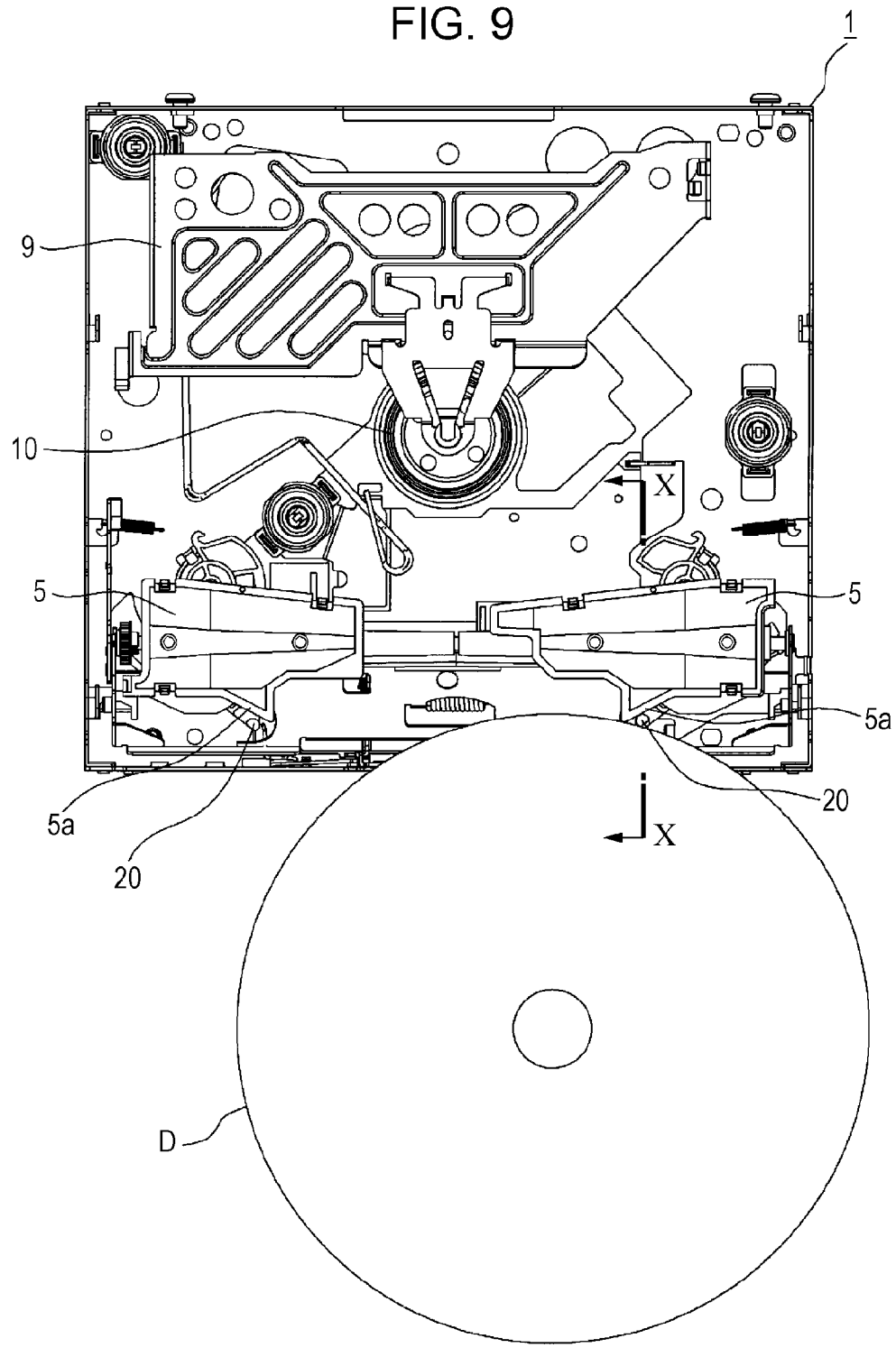
FIG. 9 is a plan view of the disk drive device having a disc shifted to the right and inserted therein.
Figure 10:
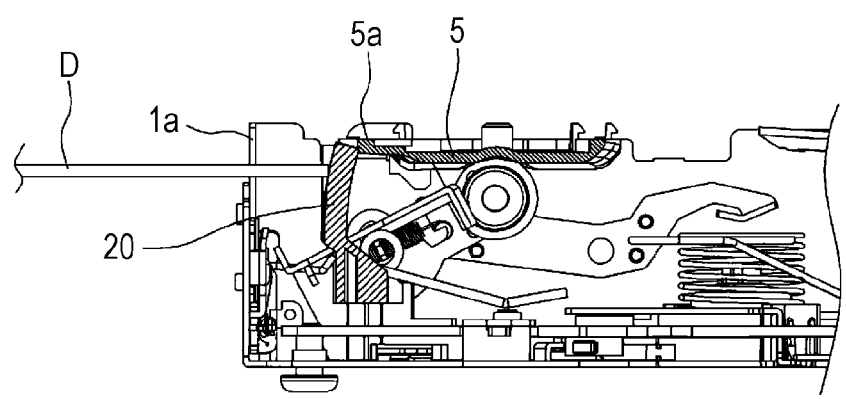
FIG. 10 is a cross-sectional view of the disk drive device taken along a line X-X of FIG. 9.
Figure 11A:
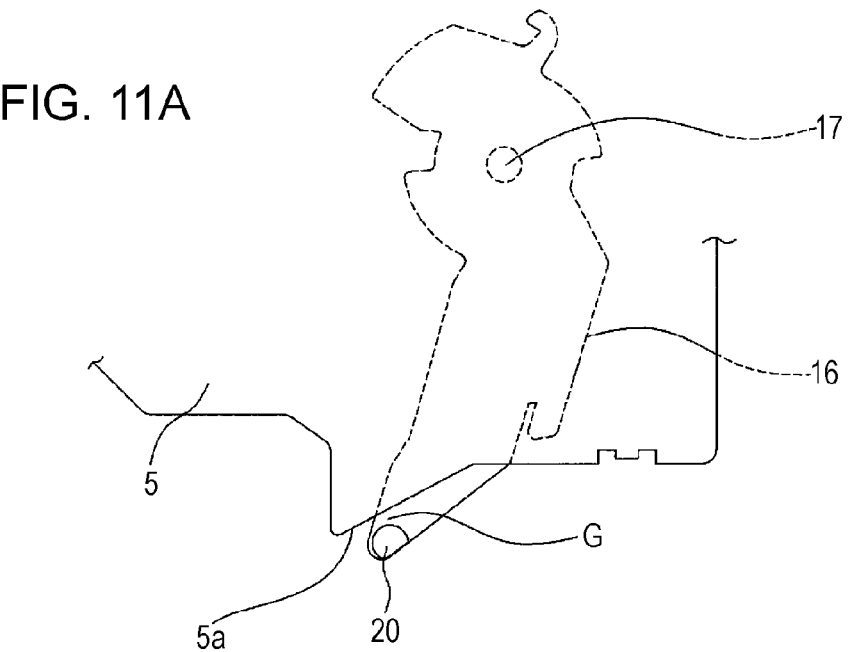
FIGS. 11A and 11B illustrate a detection pin and a guide section provided in a disk detection mechanism illustrated in FIG. 7.

For example, when, as illustrated in FIG. 9, the disk D is shifted to the right from the middle of the disk insertion slot 1a and is inserted into the disk insertion slot 1a, a pressing force is exerted on the detection pin 20 located on the right in FIG. 9 in a direction that is substantially parallel to the disk insertion direction. Thus, as illustrated in FIG. 10, the detection pin 20 is flexibly deformed in the insertion direction of the disk D, where an end of the detection pin 20 adjacent to the detection levers 16 serves as a fixed end. That is, as illustrated in FIG. 11A, when the disk D is ejected, the detection pin 20 faces the inclined side formed by the guide section 5a with the gap G therebetween.

Figure 11B:
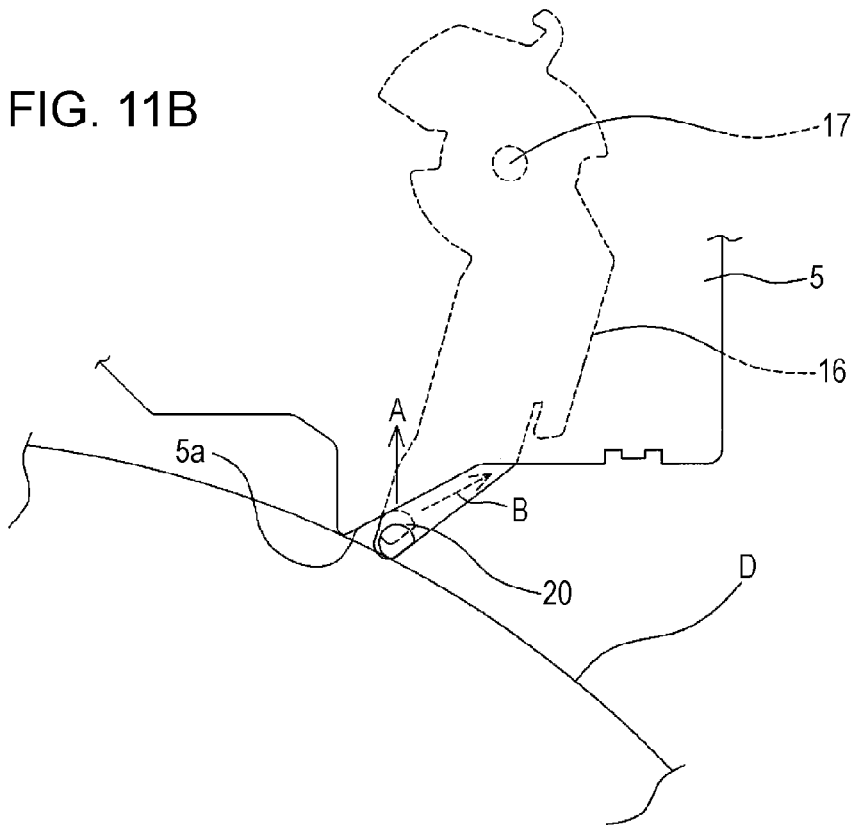

When, as illustrated in FIG. 11B, the detection pin 20 is subjected to a pressing force that is greater than or equal to a predetermined value from the disk D and the detection pin 20 is flexibly deformed, the top end (the free end) of the detection pin 20 is biased by the inclined side formed by the guide section 5a. As a result, at a pressing portion between the detection pin 20 and the guide section 5a, a component force of the contact pressing force exerted in the direction of arrow A is generated along the inclined side formed by the guide section 5a in the direction of arrow B. The component force in the direction of arrow B urges the detection pin 20 in a direction in which the detection pin 20 is moved away from the middle of the disk insertion slot 1a in the width direction (i.e., in the right direction). Accordingly, the detection lever 16 that supports the detection pin 20 smoothly rotates from the initial position toward the operating position.

It will be appreciated that if the disk D is shifted to the left of the disk insertion slot 1a and is inserted into the disk insertion slot 1a, a pressing force is exerted on the detection pin 20 located on the left in FIG. 9 by the disk D in a similar manner. Thus, the detection pin 20 is in pressure contact with the inclined side formed by the guide section 5a that is located in the rear of the detection pin 20 so as to face the detection pin 20. As a result, the detection pin 20 located on the left in FIG. 9 is urged in a direction in which the detection pin 20 moves away from the middle of the disk insertion slot 1a (i.e., in the left direction).

Accordingly, the detection lever 16 that supports the detection pin 20 smoothly rotates from the initial position toward the operating position. In addition, even when the disk D is roughly inserted into the disk insertion slot 1a or even when an odd-shaped disk, such as a star-shaped disk, is inserted and, thus, the detection pin 20 is flexibly deformed so as to be in pressure contact with the inclined side formed by the guide section 5a, the component force is exerted on the detection pin 20 in a direction in which the detection pin 20 moves away from the middle of the disk insertion slot 1a. Consequently, the detection lever 16 can be smoothly moved from the initial position toward the operating position.

In implementations of the disk drive unit described above, the guide section 5a is provided inside the device body so as to face the front panel of the frame member 1 with the detection pin 20 therebetween. The guide section 5a is formed as an inclined side that faces the free end of the detection pin 20 with the gap G therebetween. Accordingly, even when the disk D is shifted from the middle of the disk insertion slot 1a in the right-left direction and is inserted or the disk D is roughly inserted into the disk insertion slot 1a, the detection pin 20 that is subjected to a disk insertion force is flexibly deformed and is brought into pressure contact with the inclined side formed by the guide section 5a. Thus, the component force is exerted on the detection pin 20 in a direction in which the detection pin 20 moves away from the middle of the disk insertion slot 1a in the width direction. As a result of the component force, the detection levers 16 can smoothly rotate from the initial position to the operating position and, thus, deformation and damage of the detection levers 16 can be prevented.

In addition, the guide section 5a is formed in each of the guide tops 5 in an integrated manner. Since the guide top 5 is a member that is needed for pinching the disk D between itself and the transport roller 12, the need for an additional member is eliminated. By simply changing the shape of an existing guide top 5, the guide section 5a can be formed.

Figure 12:
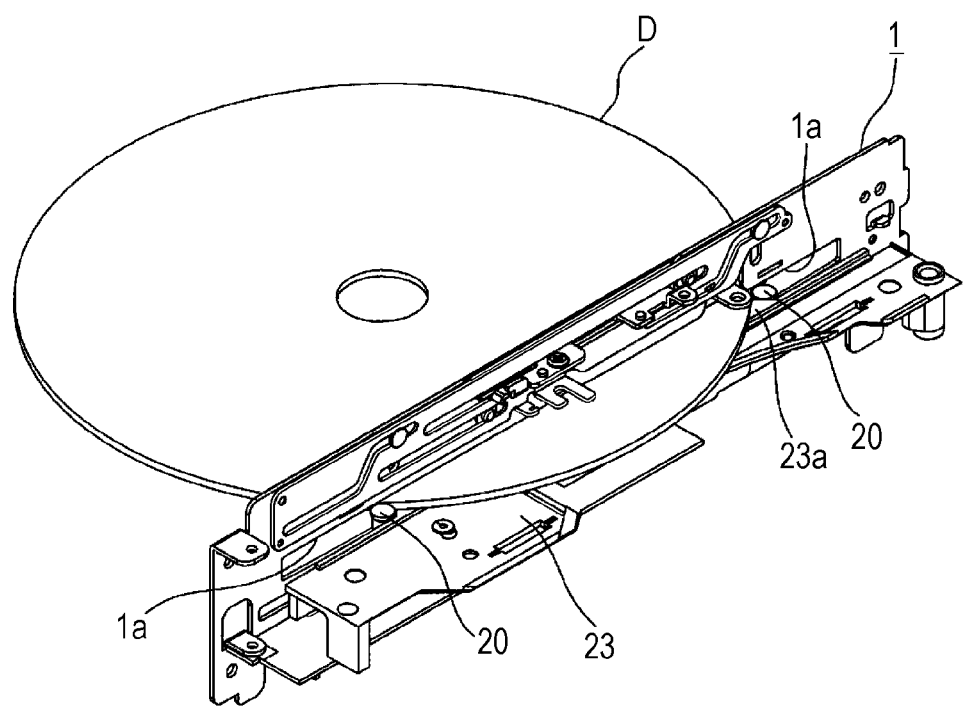
FIG. 12 is a perspective view illustrating a main portion of another implementation of a disk drive device.
Figure 13:
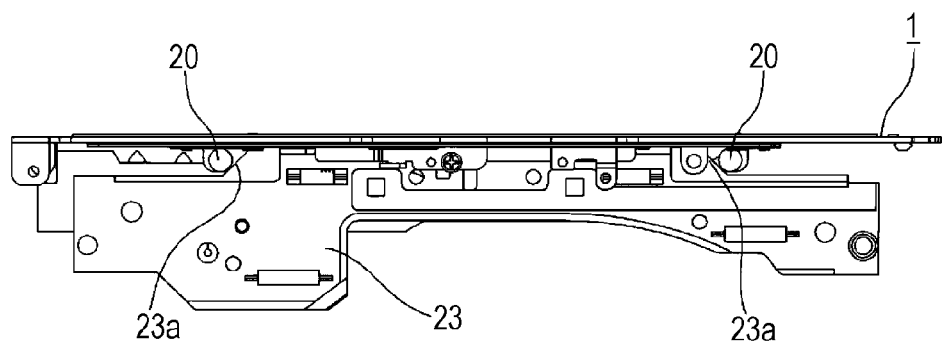
FIG. 13 is a plan view of a disk detection mechanism illustrated in FIG. 12.
Figure 14:
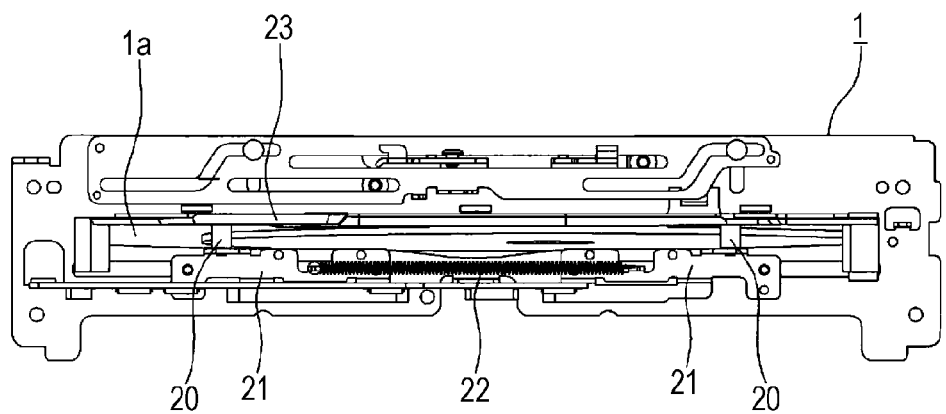
FIG. 14 is a back view of the disk detection mechanism illustrated in FIG. 12.
Figure 15:
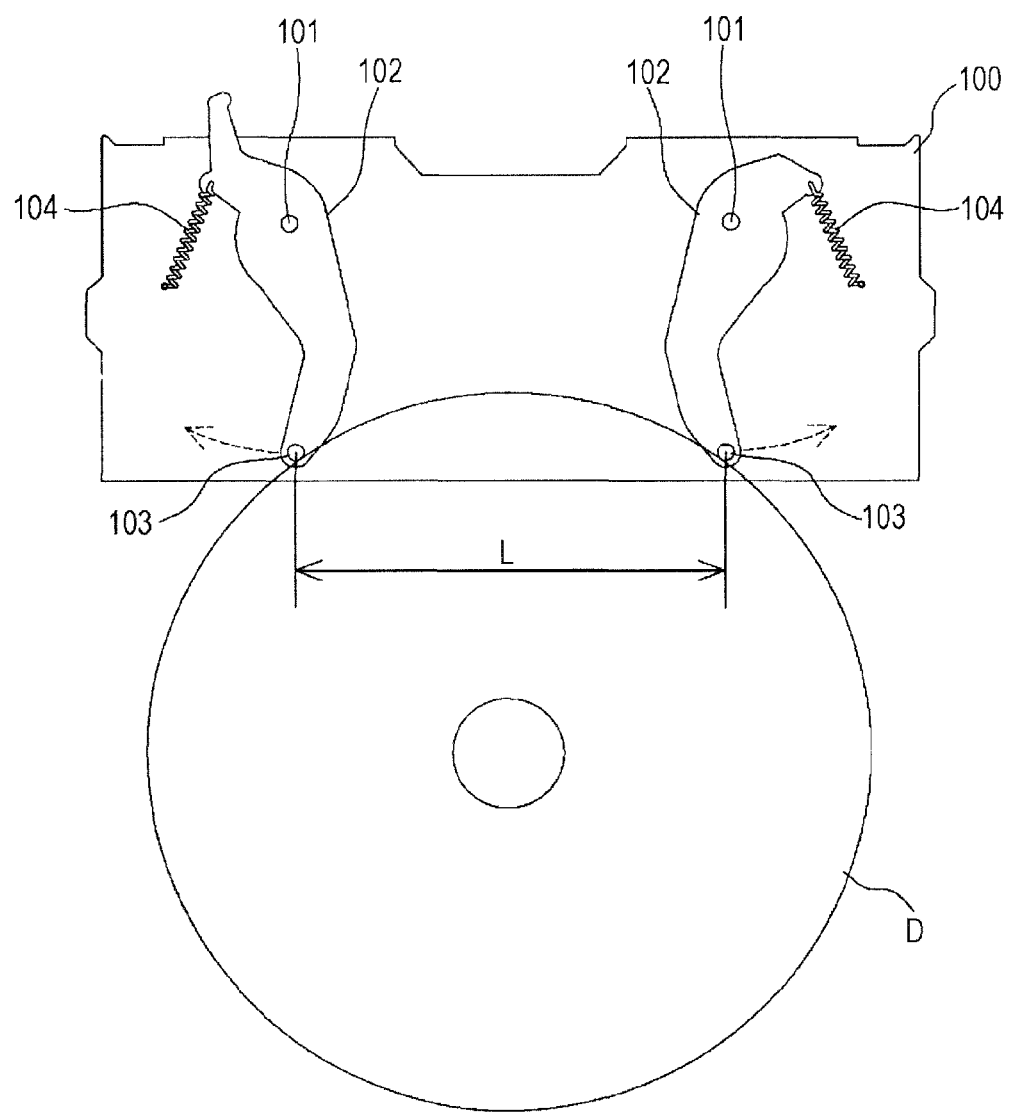
FIG. 15 illustrates a main portion of an existing disk detection mechanism.

While the implementations of the disk drive unit described above have been described with reference to the detection pin 20 supported by the detection lever 16 rotatable about the spindle 17, the detection pin 20 may be supported by a lever member movable in the right-left direction, as in implementations of the disk drive unit illustrated in FIGS. 12 to 14.

That is, other implementations of a disk drive device have a pair of lever members 21 inside of the front panel of the frame member 1 so that the lever members 21 are movable in the right-left direction. A detection pin 20 is supported by each of the lever members 21 in a cantilever fashion. The two lever members 21 are biased by a tension spring 22 in a direction in which the lever members 21 moves close to each other by a tension spring 22. In an eject state in which a disk D is not mounted in the device body, each of the lever members 21 is maintained at the initial position at which the distance between the two lever members 21 is minimized. The detection pins 20 are disposed inside of the disk insertion slot 1a provided in the front panel of the frame member 1. A guide portion 23a is located on the opposite side of the detection pin 20 from the disk insertion slot 1a. The guide portion 23a is formed as an inclined side that faces the top end (the free end) of the detection pin 20 with a gap therebetween. The guide portion 23a is provided on a front side of an appropriate member attached to the inner side of the frame member 1 (e.g., on the front side of a guide top 23).

In implementations of the disk drive device having such a configuration, even when the disk D is shifted from the middle of the disk insertion slot 1*a* in the right-left direction and is inserted, or the disk D is roughly inserted into the disk insertion slot 1*a*, the detection pin 20 that is subjected to a disk insertion force is flexibly deformed and is brought into pressure contact with the inclined side of the guide portion 23*a*. Thus, the component force is exerted on the detection pin 20 in a direction in which the detection pin 20 moves away from the middle of the disk insertion slot 1*a* in the width direction. As a result of the component force, the lever member 21 can be smoothly slidingly moved from the initial position to the operating position.

In addition, while the above-described exemplary embodiments have been described with reference to the detection pin and a guide portion disposed on both sides of the middle point of the disk insertion slot 1*a* in the width direction, the detection pin and the guide portion may be disposed on either right or left side.

It is intended that the foregoing detailed description be regarded as illustrative rather than limiting, and that it be understood that it is the following claims, including all equivalents, that are intended to define the spirit and scope of this invention.

What is claimed is:

1. A disk drive device comprising:
   a device body having a disk insertion slot formed in a front surface thereof;
   a lever member disposed inside of the device body, the lever member configured to move between an initial position and an operating position;
   a detection pin disposed on an inner side of the disk insertion slot, the detection pin being supported by the lever member in a cantilever fashion; and
   a pressing member configured to bias the lever member toward the initial position,
   wherein disk insertion into and/or disk ejection from the device body are detected by movement of the lever member between the initial position and the operating position when the detection pin is brought into contact with an outer periphery of a disk and is urged in a direction in which the detection pin moves away from a middle of the disk insertion slot in a width direction,
   wherein a guide section is provided inside of the device body so as to face a front surface of the device body with the detection pin therebetween, and the guide section is formed as an inclined side that faces a free end of the detection pin with a gap therebetween, and
   wherein when the lever member is located at the initial position and the detection pin is subjected to a pressing force of a predetermined value or higher from an inserted disk and is brought into pressure contact with the inclined side formed by the guide section, a component force is exerted on the detection pin in a direction in which the detection pin is moved away from the middle of the disk insertion slot in the width direction.

2. The disk drive device according to claim 1, further comprising:
   a transport roller disposed in the inner side of the disk insertion slot, the transport roller transporting the disk to the inside or the outside of the device body; and
   a pinching member configured to pinch the disk between itself and the transport roller,
   wherein the guide section is formed in the pinching member in an integrated fashion.

* * * * *